US012418967B2

(12) United States Patent
Vavrik et al.

(10) Patent No.: US 12,418,967 B2
(45) Date of Patent: Sep. 16, 2025

(54) LUMINAIRE SAFETY SYSTEM

(71) Applicant: ROBE lighting s.r.o., Roznov pod Radhostem (CZ)

(72) Inventors: Jindrich Vavrik, Zubri (CZ); Michal Stanek, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/079,178

(22) Filed: Mar. 13, 2025

(65) Prior Publication Data

US 2025/0212305 A1 Jun. 26, 2025

Related U.S. Application Data

(60) Provisional application No. 63/565,329, filed on Mar. 14, 2024.

(51) Int. Cl.
*H05B 47/14* (2020.01)
*F21V 21/15* (2006.01)

(52) U.S. Cl.
CPC ............ *H05B 47/14* (2020.01); *F21V 21/15* (2013.01)

(58) Field of Classification Search
CPC ............................... H05B 47/14; F21V 21/15
See application file for complete search history.

(56) References Cited

U.S. PATENT DOCUMENTS

| | | | | |
|---|---|---|---|---|
| 8,845,150 B2 * | 9/2014 | Brutsche | F21V 21/15 362/426 |
| 2010/0156315 A1 * | 6/2010 | Zhao | H05B 45/10 315/294 |
| 2020/0052626 A1 * | 2/2020 | Vavrik | H02P 8/24 |

* cited by examiner

*Primary Examiner* — Daniel D Chang
(74) *Attorney, Agent, or Firm* — Conley Rose, P.C.; Brooks W Taylor

(57) ABSTRACT

A luminaire includes a light engine control system and a light effect control system. The light engine control system includes a power delivery and measurement (PD&M) module, a light engine power control (LEPC) module, and a light engine. The light effect control system includes a motor driver module, a position monitor module, and a mechanical and optical effect system. The PD&M module measures electric power supplied to the light engine, determines whether the measured power deviates from a desired electric power and, in response, stops delivering power to the LEPC module. The position monitor module measures a sensed position of one or more effect motors of the mechanical and optical effect system, determines whether the sensed position deviates from the desired configuration, and in response, causes a reduction in an intensity of the light beam emitted by the luminaire.

23 Claims, 3 Drawing Sheets

LUMINAIRE SAFETY SYSTEM

CROSS-REFERENCE TO RELATED APPLICATIONS

This application claims priority to U.S. Provisional Application No. 63/565,329 filed Mar. 14, 2024, by Jindrich Vavrik, et al. entitled "Luminaire Safety System", which is incorporated by reference herein as if reproduced in its entirety.

TECHNICAL FIELD OF THE DISCLOSURE

The disclosure generally relates to luminaires, and more specifically to a range sensing and safety system for an automated luminaire.

BACKGROUND

Some luminaires in the entertainment and architectural lighting markets include automated and remotely controllable functions. Such luminaires may be used in theatres, television studios, concerts, theme parks, night clubs and other venues. A luminaire may provide control over the pan and tilt functions of the luminaire allowing the operator to control a direction the luminaire is pointing and thus the position on the stage or in the studio of a light beam emitted by the luminaire. Such position control may be obtained via control of the luminaire's position in two orthogonal rotational axes, which may be referred to as pan and tilt. Some products provide control over other parameters of the light beam such as intensity, color, focus, beam size, beam shape, and/or beam pattern.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

Figure 1:
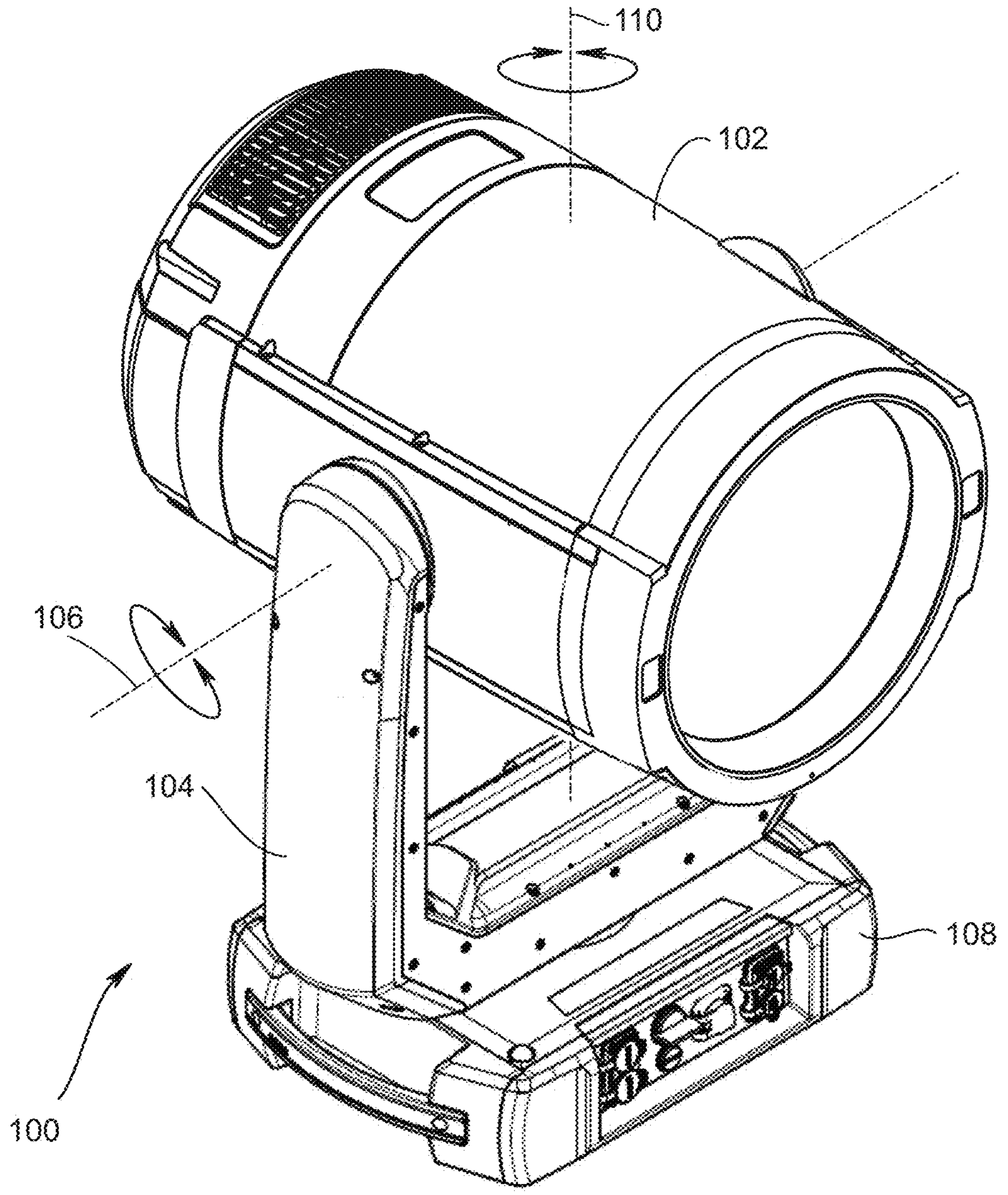
FIG. 1 presents an isometric view of a luminaire according to the disclosure in a first configuration.

In a first embodiment, a luminaire includes a light engine control system that includes a power supply, a power delivery and measurement (PD&M) module, a light engine power control (LEPC) module, and a light engine. The PD&M module and the LEPC module are configured to receive a first command that includes a desired light intensity of a light beam emitted by the light engine. The PD&M module is configured to receive electrical power from the power supply and to control electrical power supplied to the LEPC module. The LEPC module is configured to receive electrical power from the PD&M module and to control electrical power supplied to the light engine. The PD&M module is configured to repeatedly measure an electric power supplied to the light engine from the LEPC module, determine whether the measured electric power deviates by more than a threshold amount from an electric power that causes the light engine to emit light of the desired light intensity and, in response to such deviation, stop delivering power to the LEPC module. The luminaire further includes a light effect control system that includes a motor driver module, a position monitor module, and a mechanical and optical effect system. The motor driver module and the position monitor module are configured to receive a second command that includes a desired configuration of the mechanical and optical effect system. The motor driver module is configured to compare the desired configuration to a current configuration of the mechanical and optical effect system and, in the event of a mismatch, to reconfigure the mechanical and optical effect system into the desired configuration. The position monitor module is configured to repeatedly measure a sensed position of one or more effect motors of the mechanical and optical effect system, determine whether the sensed position deviates by more than a threshold amount from the desired configuration, and in response to such deviation, cause a reduction in an intensity of the light beam emitted by the luminaire.

In a second embodiment, a luminaire includes a light engine control system that includes a power supply, a power delivery and measurement (PD&M) module, a light engine power control (LEPC) module, and a light engine. The PD&M module and the LEPC module are configured to receive a first command that includes a desired light intensity of a light beam emitted by the light engine. The PD&M module is configured to receive electrical power from the power supply and to control electrical power supplied to the LEPC module. The LEPC module is configured to receive electrical power from the PD&M module and to control electrical power supplied to the light engine. The PD&M module is configured to repeatedly measure an electric power supplied to the light engine from the LEPC module, determine whether the measured electric power deviates by more than a threshold amount from an electric power that causes the light engine to emit light of the desired light intensity and, in response to such deviation, stop delivering power to the LEPC module.

In a third embodiment, a luminaire includes a light effect control system that includes a motor driver module, a position monitor module, and a mechanical and optical effect system. The motor driver module and the position monitor module are configured to receive a second command that includes a desired configuration of the mechanical and optical effect system. The motor driver module is configured to compare the desired configuration to a current configuration of the mechanical and optical effect system and, in the event of a mismatch, to reconfigure the mechanical and optical effect system into the desired configuration. The position monitor module is configured to repeatedly measure a sensed position of one or more effect motors of the mechanical and optical effect system, determine whether the sensed position deviates by more than a threshold amount from the desired configuration, and in response to such deviation, cause a reduction in an intensity of the light beam emitted by the luminaire.

DETAILED DESCRIPTION

Preferred embodiments are illustrated in the figures, like numerals being used to refer to like and corresponding parts of the various drawings.

An optical system of an automated luminaire may be designed to produce a very narrow output beam. Such a system may allow the luminaire to be used with long throws to a target or to produce almost columnar light beams. Optical systems with the ability to produce narrow beams may be referred to as 'Beam' or 'Spot' optics. The light intensity from such optical systems may be very high, possibly creating a hazard for eyes or potentially overheating an object illuminated by the beam. Control of an exact position and intensity of the light beam and of the positions of lenses and other optical effects inserted into the beam is therefore beneficial to reducing the risk of operation of such luminaires.

Some luminaires (both automated and non-automated) comprise a light source including a discharge lamp or a light emitting diode (LED) array with converging optics. Luminaires according to the disclosure comprise either high power LEDs or laser-based light sources, where a laser LED is used as a pump for a light emitting phosphor. Such a light source is designed to be small, with a reduced etendue.

In some embodiments, a light source according to the disclosure includes a laser-based light engine that comprises one or more lasers in one or more colors. In some such embodiments, the laser-based light engine may include one or more solid-state LED lasers. In some such embodiments, the laser-based light engine may include one or more conversion optical devices that convert a coherent light beam emitted by the laser(s) into an incoherent light beam (a light beam that includes waves whose wavelengths are not in phase with each other and/or waves that oscillate at different frequencies). Such conversion optical devices may comprise phosphor panels or filters. In some such embodiments, the light engine comprises a solid-state LED laser emitting coherent blue light that excites a phosphor to emit incoherent white light. In other embodiments, the light engine comprises high power LEDs.

Such light sources according to the disclosure emit a beam with a high intensity from a small effective light-emitting area. Luminaires comprising a light source according to the disclosure may further include a variety of optical systems: e.g., a "beam" optical system that maintains the small diameter of the light beam emitted by the light source, producing a light beam with a fixed beam angle; a "wash" optical system that produces a wide beam of fixed beam angle from the light beam emitted by the light source; or a "spot" (zoom) optical system that can controllably vary the beam diameter (beam angle) between a narrow beam and a wide beam. In some embodiments, such a zoom optical system also has the ability to project good quality images from gobos or patterns inserted into the light beam of the optical system.

As discussed above, luminaires emitting a very narrow beam may emit a light beam having a high luminous power density. If the power density exceeds certain predefined levels, such a beam may be a hazard to the eyes or body of persons in the beam, or may risk of damage to scenery, structure, or fabrics. For this reason, luminaires emitting such light beams may be subject to various regulatory controls in various jurisdictions.

While the light output from either LED light engines or LED laser-based light sources is not coherent laser light, it may still have a high luminous power density as discussed above. Luminaires according to the disclosure include methods and systems for satisfying regulatory requirements and reducing potential physical problems of an emitted beam of high luminous power density.

FIG. 1 presents an isometric view of a luminaire 100 according to the disclosure. The luminaire 100 is an automated luminaire comprising a head 102 which is configured to rotate within a yoke 104 about a tilt axis 106. The yoke 104 is configured to rotate relative to a fixed enclosure 108 about a pan axis 110. The pan axis 110 and the tilt axis 106 are orthogonal to each other. Both pan and tilt motions may be mechanically coupled to hand-operated manual controls or may be coupled for motion to motors, linear actuators, or other electromechanically controlled mechanisms. Such electromechanical mechanisms may be under the control of a microcontroller or other programmable processing system included in the luminaire 100. In some embodiments, the processing system may be controlled locally via a user interface included in the luminaire 100. In other embodiments, the processing system may be in wired or wireless communication with a remotely located control console used by an operator to signal a desired position of the head 102. In such embodiments, the operator is able to direct light output from the automated luminaire in a desired direction, through motion of the head 102 in the pan axis 110 and tilt axis 106.

In some embodiments, the operator (either locally or remotely) controls a power output level of the light beam. To ensure that the light beam is always at the power output level the operator has commanded, and to protect against failures in a light engine power control system affecting the beam power output level, luminaires according to the disclosure include a backup measurement and protection control system for the light engine. The measurement and protection control system includes redundancy to provide correct operation even when signals or circuits have failed.

Figure 2:
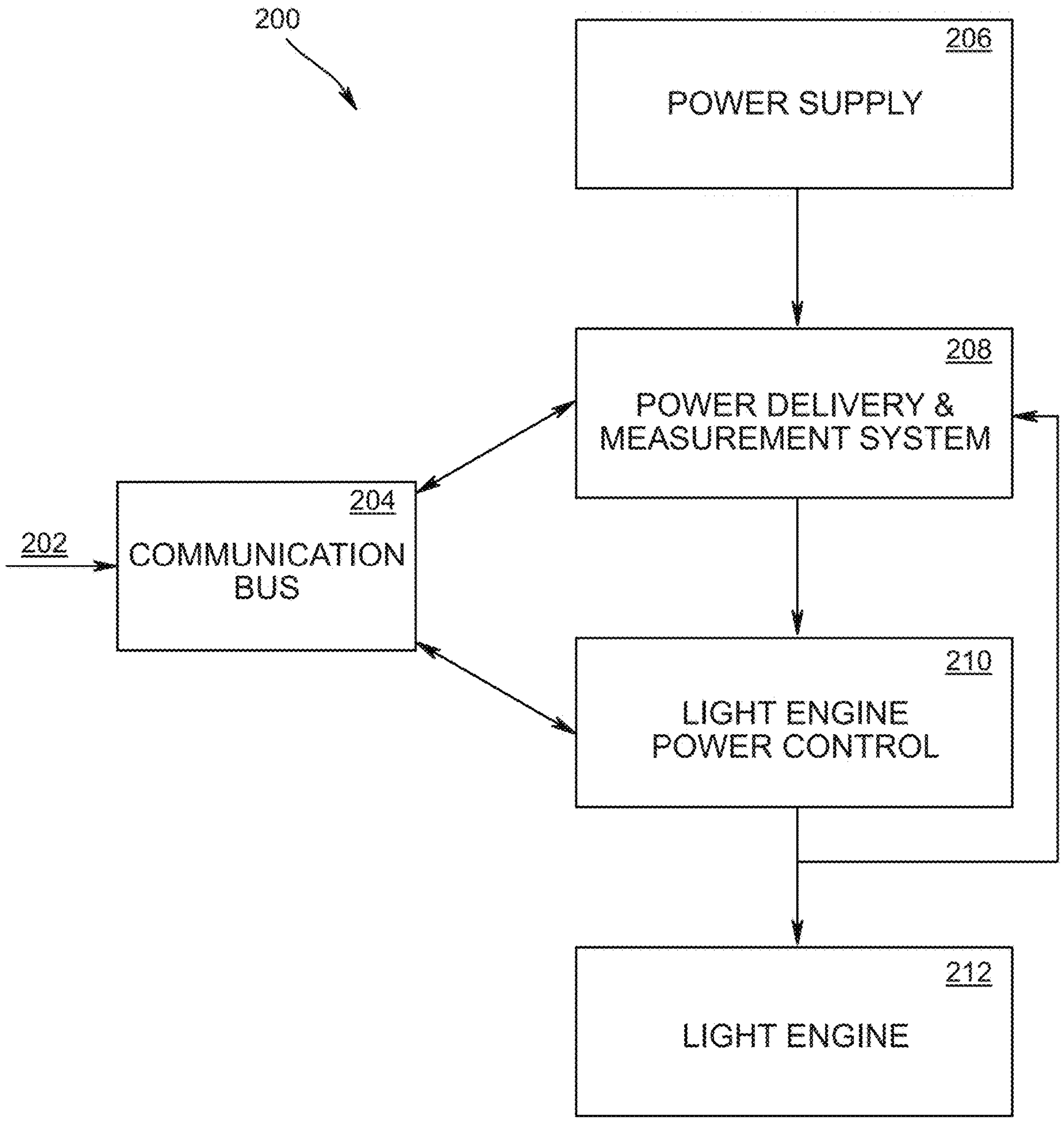
FIG. 2 illustrates a block diagram of a light engine control system according to the disclosure.

FIG. 2 illustrates a block diagram of a light engine control system 200 of the luminaire 100 according to the disclosure. The light engine control system 200 includes a communication bus 204, a power supply 206, a power delivery and measurement (PD&M) module 208, a light engine power control (LEPC) module 210, and a light engine 212. The PD&M module 208 is configured to receive electrical power from the power supply 206 and to control electrical power delivered to the LEPC module 210. The LEPC module 210 is configured to receive electrical power from the PD&M module 208 and to control electrical power supplied to the light engine 212.

A signal 202 received via the communication bus 204 may include a command from an operator of the light engine control system 200, where the command comprises data representing a desired intensity for a light beam emitted by a light engine 212. The signal 202 may include control signals from a local user interface or from a lighting control desk or a lighting control network. As such, the signal 202 may be received from a source internal or external to the luminaire 100. The signal 202 may be encoded using DMX-512, Art-Net, ACN (Architecture for Control Networks), Streaming ACN, or other suitable communication protocol.

In some embodiments, the communication bus 204 is within the luminaire 100 and is a data bus that connects internal subsystems together, allowing intercommunication between modules. The communication bus 204 is communicatively coupled to both the PD&M module 208 and the LEPC module 210. The desired light intensity value from the signal 202 is communicated via the communication bus 204 to both the PD&M module 208 and the LEPC module 210. The LEPC module 210 determines whether the light engine 212 is delivering the desired light intensity and, if not, adjusts either or both of a current and a voltage (i.e., electrical power) supplied to the light engine 212 so as to provide the desired light intensity. In some embodiments, LEPC module 210 receives power from the PD&M module 208 and modulates—e.g., via pulse width modulation (PWM)—the power to cause the light engine 212 to emit light of the desired light intensity.

The PD&M module 208, independently from the LEPC module 210, repeatedly measures the electric power supplied to the light engine 212 from the LEPC module 210. In some embodiments, the PD&M module 208 makes this determination by measuring a LEPC current drawn from the PD&M module 208 by the LEPC module 210. In other embodiments, the PD&M module 208 makes this determination by measuring a light engine input current that is input to the light engine 212 from the LEPC module 210. In either embodiment, based on the measured current and a voltage the PD&M module 208 is providing to the LEPC module 210, the PD&M module 208 is configured to determine a measured electric power being provided to the LEPC module 210. The PD&M module 208 compares the measured electric power to a desired electric power required for the light engine 212 to emit light of the desired light intensity. If the PD&M module 208 determines that the measured current deviates by more than a threshold amount from a current required for the desired electric power, the PD&M module 208 may stop delivering power to the LEPC module 210. The power supply 206 is coupled to and provides electrical power to the PD&M module 208. In some embodiments the PD&M module 208 and the LEPC module 210 are entirely separate modules with separate circuit boards and components.

In some embodiments, where a maximum light intensity level is mandated by regulation as a maximum intensity that can be emitted by a luminaire when a light beam from the luminaire is able to impinge on an audience or other target, the PD&M module 208 is configured to receive, via the signal 202, a maximum allowable intensity for a light beam emitted by the light engine 212. In operation, a failure of the LEPC module 210 may cause the electrical power supplied to the light engine 212 by the LEPC module 210 to increase to a level that would cause the light engine 212 to emit a light beam having an intensity level greater than the maximum allowable intensity. The PD&M module 208 is configured to detect such elevated voltage and/or current levels supplied by the LEPC module 210 and, in response, to disconnect power to the LEPC module 210. In some such embodiments, the LEPC module 210 scales a desired intensity received in the signal 202 so that the maximum level of desired intensity causes the light engine 212 to emit a light beam having an intensity level equal to the maximum allowable intensity.

It is not solely the intensity or optical power of the light engine 212 that results in potential hazard in the emitted light beam. In one example, a zoom optical system in a first configuration of its elements may cause the luminaire 100 to emit a narrow beam with a higher intensity level and, in a second configuration of its elements cause the luminaire 100 to emit a wide light beam of lower intensity level. In another example, a focused, hard edged beam may be more of a hazard than a beam that is defocused. As yet another example, configurations of some optical effects, such as prisms and auxiliary lenses, with effect elements in or out of the light beam may increase or reduce the hazard from the resulting emitted light beam. In various embodiments according to the disclosure, control of such optical devices or systems may be through motorized systems that, for example, control the configuration of lenses for a beam angle control (i.e., zoom) system. With other optical devices, such as prisms or auxiliary lenses, other motorized systems may be used to insert and remove the optical devices in the light beam emitted from the luminaire 100. As with the electrical power provided by the LEPC module 210, the disclosed system monitors these motor movements with independent systems to ensure that the motorized optical effect or lens systems are in the correct configuration, as described below with reference to FIG. 3.

Figure 3:
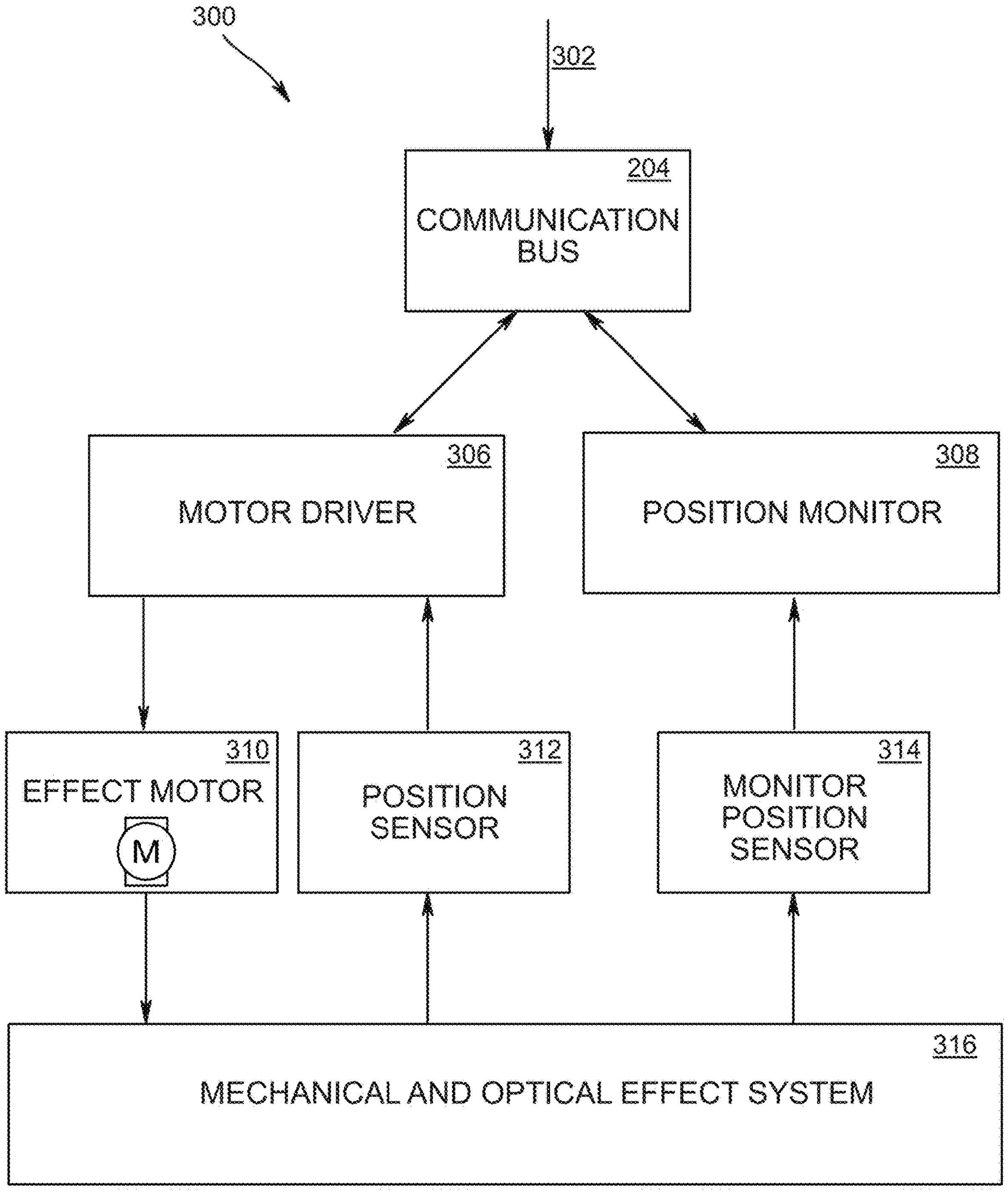
FIG. 3 illustrates a block diagram of a light effect control system according to the disclosure.

FIG. 3 illustrates a block diagram of a light effect control system 300 according to the disclosure. A signal 302 received from an operator via the communication bus 204 may include a command comprising data representing a desired configuration for the elements of one or more devices of a mechanical and optical effect system 316. As described for the signal 202, the signal 302 may be received from a source internal or external to the luminaire 100. Such mechanical systems include pan and/or tilt systems that control a direction the luminaire is pointing and in which the luminaire is emitting its light beam. The mechanical and optical effect system 316 includes optical devices configured to receive a light beam emitted by the light engine 212 and to emit a modified light beam. In various embodiments, the mechanical and optical effect system 316 may include one or more of pan and/or tilt systems, a zoom lens, focus lens, prism, or other optical device. The signal 302 may include control signals from a local user interface or from a lighting control desk or a lighting control network. The signal 302 may be encoded using DMX-512, Art-Net, ACN, Streaming ACN, or other suitable communication protocol.

In some embodiments the communication bus 204 of FIG. 2 and the communication bus 204 of FIG. 3 are implemented as separate, independent data busses. The communication bus 204 is communicatively coupled to both a motor driver module 306 and a position monitor module 308.

The desired configuration for the mechanical and optical effect system 316 in the command is communicated via the communication bus 204 to both the motor driver module 306 and the position monitor module 308. In response to the receipt of the desired configuration, the motor driver module 306 is configured to compare the desired configuration to a current configuration of the mechanical and optical effect system and, in the event of a mismatch, to reconfigure the mechanical and optical effect system 316 by controlling a position of at least one effect motor 310, based upon feedback from a position sensor 312, until the mechanical and optical effect system 316 is in the desired configuration. In some embodiments, the feedback from the position sensor 312 may be received by the motor driver module 306 via the communication bus 204. Obtaining the desired configuration may include controlling the positions of a plurality of effect motors, based upon feedback from a plurality of associated position sensors 312.

The position monitor module 308, independently from the motor driver module 306, repeatedly measures a sensed position of one or more effect motors of the mechanical and optical effect system 316 using a monitor position sensor 314 that is separate from the position sensor 312. In some embodiments, the feedback from the monitor position sensor 314 may be received by the position monitor module 308 via the communication bus 204. If the position monitor module 308 determines that the sensed position deviates by more than a threshold amount from the desired configuration, the position monitor module 308 may cause a reduction in the intensity of the light beam emitted by the luminaire 100. In some embodiments, the position monitor module 308 sends a signal 202 to the light engine control system 200, via the communication bus 204, the signal 202 configured to cause the LEPC module 210 to reduce the electrical power supplied to the light engine 212. In other embodiments, the signal 202 is configured to cause the PD&M module 208 to cease delivering power to the LEPC module 210. In still other embodiments, the signal 202 is configured to cause the power supply 206 to cease delivering power to the light engine 212.

In some embodiments, the signal 302 may include a command that comprises allowable data representing allowable (or safe) configurations for one or more devices of the mechanical and optical effect system 316. The allowable data may be one or more ranges of pan and/or tilt positions that do not direct the luminaire beam onto, for example, the audience or a set piece or other heat-sensitive object. The allowable data may be one or more configurations of a zoom system that produce a beam with a sufficiently wide beam angle not to have a dangerously high beam intensity. In any such embodiment, the allowable data is stored in memory of the luminaire 100 and the position monitor module 308 is configured to determine whether the sensed position indicates that one or more of the pan/tilt, zoom, prism or other sub-systems of the mechanical and optical effect system 316 have been moved into a position that is more than a threshold amount outside the allowable configurations, either manually or by occurrence of a system fault, the position monitor module 308 takes an action to reduce the intensity of the light beam emitted by the luminaire 100, such as the actions described above.

In some embodiments, the motor driver module 306 and the position monitor module 308 are entirely separate modules, comprising individual circuit boards and components. In some such embodiments, the position sensor 312 and the monitor position sensor 314 have separate electrical and/or mechanical connections to the mechanical and optical effect system 316.

In some embodiments, allowance is made for jitter in the incoming signal 202 or 302. For example, with DMX-512, the LEPC module 210 and/or the motor driver module 306 may be configured to receive a predefined threshold number of consecutive identical packets of data before responding with a change in light intensity or position, respectively, so as to reduce the effect of erroneous data packets.

In some embodiments, the disclosed safety systems operate at all times that the luminaire 100 is powered up. In this way, even during set-up, when scenery, seating area, or other parts of the structure are being prepared for performance and workers are on stage, any failure in either the LEPC module 210 or the motor driver module 306 will be detected and the light output reduced or disabled.

Each of the PD&M module 208, the LEPC module 210, the motor driver module 306, and the position monitor module 308 may be implemented by a microcontroller or other programmable processing system included in the luminaire 100.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire comprising:

a light engine control system comprising a power supply, a power delivery and measurement (PD&M) module, a light engine power control (LEPC) module, and a light engine, wherein:

the PD&M module and the LEPC module are configured to receive a first command that includes a desired light intensity of a light beam emitted by the light engine;

the PD&M module is configured to receive electrical power from the power supply and to control electrical power supplied to the LEPC module;

the LEPC module is configured to receive electrical power from the PD&M module and to control electrical power supplied to the light engine; and the PD&M module is configured to:

repeatedly measure an electric power supplied to the light engine from the LEPC module; and determine whether the measured electric power deviates by more than a threshold amount from an electric power that causes the light engine to emit light of the desired light intensity and, in response to such deviation, stop delivering power to the LEPC module; and a light effect control system comprising a motor driver module, a position monitor module, and a mechanical and optical effect system, wherein:

the motor driver module and the position monitor module are configured to receive a second command that includes a desired configuration of the mechanical and optical effect system;

the motor driver module is configured to compare the desired configuration to a current configuration of the mechanical and optical effect system and, in the event of a mismatch, to reconfigure the mechanical and optical effect system into the desired configuration;

the position monitor module is configured to:

repeatedly measure a sensed position of one or more effect motors of the mechanical and optical effect system; and determine whether the sensed position deviates by more than a threshold amount from the desired configuration and, in response to such deviation, cause a reduction in an intensity of the light beam emitted by the luminaire.

2. The luminaire of claim 1, wherein the PD&M module is configured to measure an electric power supplied to the light engine from the LEPC module by:

measuring by the PD&M module a light engine input current that is input to the light engine from the LEPC module;

determining in the PD&M module a voltage provided to the LEPC module from the PD&M module; and determine the electric power supplied to the light engine by the LEPC module based on the light engine input current and the voltage.

3. The luminaire of claim 1, wherein the PD&M module is configured to measure an electric power supplied to the light engine from the LEPC module by:

measuring in the PD&M module a light engine power control current that is drawn from the PD&M module by the LEPC module;

determining in the PD&M module a voltage provided to the LEPC module from the PD&M module; and determine the electric power supplied to the light engine by the LEPC module based on the light engine power control current and the voltage.

4. The luminaire of claim 1, wherein the PD&M module is configured to:

receive a second command that includes a maximum allowable intensity for a light beam emitted by the light engine; and determine whether the measured electric power would cause the light engine to emit a light beam having an intensity level greater than the maximum allowable intensity and, in response, stop delivering power to the LEPC module.

5. The luminaire of claim 1, wherein the PD&M module and the LEPC module are coupled to a communication bus and configured to receive the first command via a first signal received via the communication bus.

6. The luminaire of claim 1, wherein the PD&M module comprises a first circuit board and components, the LEPC module comprises a second circuit board and components, and the first circuit board and components are separate from the second circuit board and components.

7. The luminaire of claim 1, wherein the motor driver module comprises a first position sensor to determine the current configuration of the mechanical and optical effect system and the position monitor module comprises a second sensor to determine the current configuration of the mechanical and optical effect system, where the first position sensor is separate from the second sensor.

8. The luminaire of claim 1, wherein the position monitor module causes the reduction in the intensity of the light beam emitted by the luminaire by sending a second signal to the light engine control system, the second signal configured to cause one of:

the LEPC module to reduce the electrical power supplied to the light engine, the PD&M system to cease delivering power to the LEPC module, or the power supply to cease delivering power to the light engine.

9. The luminaire of claim 1, wherein:

the motor driver module and the position monitor module are configured to receive a third command that includes allowable data representing allowable configurations for one or more subsystems of the mechanical and optical effect system, wherein the allowable data includes a position or a range of positions for each of one or more sub-systems of the mechanical and optical effect system; and the position monitor module is further configured to determine whether the sensed position deviates by more than a threshold amount from the allowable data and, in response to such deviation, cause a reduction in the intensity of the light beam emitted by the luminaire.

10. The luminaire of claim 9, wherein the motor driver module and the position monitor module are coupled to a communication bus and configured to receive the third command via a third signal received via the communication bus.

11. The luminaire of claim 1, wherein the motor driver module comprises a third circuit board and components, the position monitor module comprises a fourth circuit board and components, and the third circuit board and components are separate from the fourth circuit board and components.

12. A luminaire comprising:

a light engine control system comprising a power supply, a power delivery and measurement (PD&M) module, a light engine power control (LEPC) module, and a light engine, wherein:

the PD&M module and the LEPC module are configured to receive a first command that includes a desired light intensity of a light beam emitted by the light engine;

the PD&M module is configured to receive electrical power from the power supply and to control electrical power supplied to the LEPC module;

the LEPC module is configured to receive electrical power from the PD&M module and to control electrical power supplied to the light engine; and the PD&M module is configured to:

repeatedly measure an electric power supplied to the light engine from the LEPC module; and determine whether the measured electric power deviates by more than a threshold amount from an electric power that causes the light engine to emit light of the desired light intensity and, in response to such deviation, stop delivering power to the LEPC module.

13. The luminaire of claim 12, wherein the PD&M module is configured to measure an electric power supplied to the light engine from the LEPC module by:

measuring by the PD&M module a light engine input current that is input to the light engine from the LEPC module;

determining in the PD&M module a voltage provided to the LEPC module from the PD&M module; and determine the electric power supplied to the light engine by the LEPC module based on the light engine input current and the voltage.

14. The luminaire of claim 12, wherein the PD&M module is configured to measure an electric power supplied to the light engine from the LEPC module by:

measuring in the PD&M module a light engine power control current that is drawn from the PD&M module by the LEPC module;

determining in the PD&M module a voltage provided to the LEPC module from the PD&M module; and determine the electric power supplied to the light engine by the LEPC module based on the light engine power control current and the voltage.

15. The luminaire of claim 12, wherein the PD&M module is configured to:

receive a second command that includes a maximum allowable intensity for a light beam emitted by the light engine; and determine whether the measured electric power would cause the light engine to emit a light beam having an intensity level greater than the maximum allowable intensity and, in response, stop delivering power to the LEPC module.

16. The luminaire of claim 12, wherein the PD&M module and the LEPC module are coupled to a communication bus and configured to receive the first command via a signal received via the communication bus.

17. The luminaire of claim 12, wherein the PD&M module comprises a first circuit board and components, the LEPC module comprises a second circuit board and components, and the first circuit board and components are separate from the second circuit board and components.

18. A luminaire, the luminaire comprising:

a light engine, configured to emit a light beam; and a light effect control system comprising a motor driver module, a position monitor module, and a mechanical and optical effect system, wherein:

the motor driver module and the position monitor module are configured to receive a first command that includes a desired configuration of the mechanical and optical effect system;

the motor driver module is configured to compare the desired configuration to a current configuration of the mechanical and optical effect system and, in the event of a mismatch, to reconfigure the mechanical and optical effect system into the desired configuration;

the position monitor module is configured to:

repeatedly measure a sensed position of one or more effect motors of the mechanical and optical effect system; and determine whether the sensed position deviates by more than a threshold amount from the desired configuration and, in response to such deviation, cause a reduction in an intensity of the light beam emitted by the luminaire.

19. The luminaire of claim 18, wherein the motor driver module comprises a first position sensor to determine the current configuration of the mechanical and optical effect system and the position monitor module comprises a second sensor to determine the current configuration of the mechanical and optical effect system, where the first position sensor is separate from the second sensor.

20. The luminaire of claim 18, further comprising a light engine control system configured to control electrical power supplied to the light engine, wherein the position monitor module causes the reduction in the intensity of the light beam by sending a signal to the light engine control system, the signal configured to cause one of:

the light engine control system to reduce the electrical power supplied to the light engine, the light engine control system to cease delivering power to the light engine.

21. The luminaire of claim 18, wherein:

the motor driver module and the position monitor module are configured to receive a second command that includes allowable data representing allowable configurations for one or more subsystems of the mechanical and optical effect system, wherein the allowable data includes a position or a range of positions for each of one or more sub-systems of the mechanical and optical effect system; and the position monitor module is further configured to determine whether the sensed position deviates by more than a threshold amount from the allowable data and, in response to such deviation, cause a reduction in the intensity of the light beam emitted by the luminaire.

22. The luminaire of claim 21, wherein the motor driver module and the position monitor module are coupled to a communication bus and configured to receive the second command via a signal received via the communication bus.

23. The luminaire of claim 18, wherein the motor driver module comprises a first circuit board and components, the position monitor module comprises a second circuit board and components, and the first circuit board and components are separate from the second circuit board and components.

* * * * *